United States Patent
Kuroda et al.

(10) Patent No.: US 10,341,210 B2
(45) Date of Patent: Jul. 2, 2019

(54) DATA REGISTRATION SYSTEM, DATA REGISTRATION METHOD, PROGRAM AND NON-TRANSITORY RECORDING MEDIUM

(71) Applicant: Rakuten, Inc., Tokyo (JP)

(72) Inventors: Hisanori Kuroda, Tokyo (JP); Yosuke Oto, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 244 days.

(21) Appl. No.: 15/103,347

(22) PCT Filed: Mar. 12, 2014

(86) PCT No.: PCT/JP2014/056463
§ 371 (c)(1),
(2) Date: Jun. 10, 2016

(87) PCT Pub. No.: WO2015/136638
PCT Pub. Date: Sep. 17, 2015

(65) Prior Publication Data
US 2016/0308746 A1    Oct. 20, 2016

(51) Int. Cl.
*G06F 15/177* (2006.01)
*H04L 12/26* (2006.01)
(Continued)

(52) U.S. Cl.
CPC ......... *H04L 43/10* (2013.01); *G06Q 30/0601* (2013.01); *H04L 67/06* (2013.01); *H04L 67/1097* (2013.01)

(58) Field of Classification Search
CPC ..... H04L 43/10; H04L 67/1097; H04L 67/06; H04L 12/26; H04L 29/08; G06Q 30/0601; G06Q 30/06
See application file for complete search history.

(56) References Cited

U.S. PATENT DOCUMENTS

2002/0099952 A1* 7/2002 Lambert .............. G06F 21/51
726/27
2007/0150956 A1* 6/2007 Sharma ............... G06F 21/554
726/24
(Continued)

FOREIGN PATENT DOCUMENTS

| JP | 2007-257282 A | 10/2007 |
| JP | 2007257282 A | * 10/2007 |
| JP | 2011-150570 A | 8/2011 |

OTHER PUBLICATIONS

International Search Report for PCT/JP2014/056463 dated Jun. 24, 2014.

*Primary Examiner* — Benjamin M Thieu
(74) *Attorney, Agent, or Firm* — Sughrue Mion, PLLC

(57) ABSTRACT

A data registration system (1) includes a terminal (20), a storage (10), and a server (30) communicable one another via a network. The terminal (20) executes check program (11) stored in a first area (P) of the storage (10) to function as a data receiving unit (21), a format checking unit (22), a data storing unit (23), and an alerting unit (24). The format checking unit (22) checks whether or not the format of data received by the data receiving unit (21) is correct. When the format of the data is correct, the data storing unit (23) stores this data in a second area (D1 to Dn) of the storage (10). An executing unit (32) of the server (30) executes a process to the data which is stored in the second area (D1 to Dn) of the storage (10) and which has the correct format.

25 Claims, 9 Drawing Sheets

(51) Int. Cl.
*G06Q 30/06* (2012.01)
*H04L 29/08* (2006.01)

(56) References Cited

U.S. PATENT DOCUMENTS

| | | | | |
|---|---|---|---|---|
| 2007/0261051 A1* | 11/2007 | Porter | ................... | G06F 21/554 |
| | | | | 717/174 |
| 2011/0246491 A1* | 10/2011 | Clash | ................... | G06F 17/302 |
| | | | | 707/755 |
| 2012/0310983 A1* | 12/2012 | Mittal | ..................... | G06F 21/44 |
| | | | | 707/785 |
| 2014/0181116 A1* | 6/2014 | Wang | ................ | G06F 17/30097 |
| | | | | 707/741 |

* cited by examiner

FIG.4

| COMMERCIAL-PRODUCT ID | COMMERCIAL-PRODUCT NAME | CATEGORY | SALES PRICE | QUANTITY | ... |
|---|---|---|---|---|---|
| G001 | COMMERCIL PRODUCT A | CLOTHING | ¥5,000 | 30 | ... |
| G002 | COMMERCIL PRODUCT B | GENERAL MERCHANDISE | ¥1,200 | 100 | ... |
| G003 | COMMERCIL PRODUCT C | FOODS | ¥700 | 50 | ... |
| ⋮ | ⋮ | ⋮ | ⋮ | ⋮ | |

DATA REGISTRATION SYSTEM, DATA REGISTRATION METHOD, PROGRAM AND NON-TRANSITORY RECORDING MEDIUM

CROSS REFERENCE TO RELATED APPLICATIONS

This application is a National Stage of International Application No. PCT/JP2014/056463 filed Mar. 12, 2014, the contents of which are incorporated herein by reference in their entirety.

TECHNICAL FIELD

The present disclosure relates to a data registration system, a data registration method, a program and a non-transitory recording medium which register data in a storage connected so as to be communicable via a computer communication network.

BACKGROUND ART

Conventionally, shopping sites where multiple shops are opened up over the Internet are known. According to such shopping sites, each shop registers, in a server that manages a shopping site, data on a commercial product to be sold by that shop. In addition, the server provides the data on the commercial product to a terminal in accordance with a request from the terminal of a user who wants to purchase the commercial product (see, for example, Patent Literature 1).

CITATION LIST

Patent Literature

Patent Literature 1: Unexamined Japanese Patent Application Kokai Publication No. 2011-150570

SUMMARY OF INVENTION

Technical Problem

According to shopping sites disclosed in, for example, Patent Literature 1, in general, a format that facilitates a management on the server is pre-defined for data on a commercial product provided to the server from the shop. Hence, it is necessary for a manager of the server to check, before registering the data on the commercial product provided from each shop in a commercial product database, whether or not the data matches the pre-defined format, taking a time for the manager of the server.

The present disclosure has been made in view of the aforementioned circumstances, and it is an objective of the present disclosure to provide a data registration system, a data registration method, a program, and a non-transitory recording medium which can easily manage received data.

Solution to Problem

In order to accomplish the above objective, a data registration system according to a first aspect of the present disclosure includes a terminal, a storage, and a server able to communicate one another via a computer communication network, in which:

(a) the terminal functions as, upon executing a program stored in a first area of the storage:
a receiving unit that receives data;
a checking unit that checks whether or not a format of the data is correct;
a storing unit that stores, when the format of the data is correct, the data with the correct format in a second area of the storage; and
an alerting unit that gives an alert when the format of the data is incorrect, and (b) the server comprises an executing unit that executes a process to the data which has the correct format and which is stored in the second area of the storage.

In the data registration system according to the above aspect, the storing unit writes, in a file that has a file name based on a predetermined regulation in the second area, the data that has the correct format, thereby storing the data with the correct format, and the executing unit reads data from the file which has the file name based on the predetermined regulation and which is stored in the second area, and executes the process to the read data.

In the data registration system according to the above aspect, the file name based on the predetermined regulation contains a hash value of the data, and the executing unit executes the process to the read data when the hash value in the file name based on the predetermined regulation is consistent with a hash value of the data read from the file that has the file name based on the predetermined regulation.

In the data registration system according to the above aspect, the storage is accessible from the terminal and the server through an online storage service, a network storage service, or a file hosting service, the first area enables the server to read data therefrom and write data therein, and enables the terminal and other terminals to read data therefrom, the second area enables the server to read data therefrom, enables the terminal to read data therefrom and write data therein, and prohibits the other terminals to read data therefrom and write data therein, and a latest version of the program is written in the first area by the server.

In the data registration system according to the above aspect, the first area and the second area are mounted on a file system of the terminal, and when, in the terminal, a file containing the data is subjected to a drag and drop operation to the program or a program that is a copy of the program in a local storage of the terminal, the program subjected to the drag and drop operation is executed by the terminal, and data contained in the file subjected to the drag and drop operation is received by the receiving unit.

In the data registration system according to the above aspect, the alerting unit gives the alert when there is a file that has a file name not based on the predetermined regulation in the second area.

In the data registration system according to the above aspect, the storing unit stores, in the second area, a version of a program executed by the terminal or a hashed value of the program together with the data that has the correct format, and the executing unit: (1) executes the process to the stored data when the version or the hash value of the program stored in the first area is consistent with the version or the hash value of the program stored in the second area; and (2) informs the terminal that the program currently stored in the first area should be executed when the version or the hash value of the program stored in the first area is inconsistent with the version or the hash value of the program stored in the second area.

A data registration method according to a second aspect of the present disclosure is executed by a data registration system that includes a terminal, a storage, and a server communicable one another via a computer communication network, in which:

the terminal includes a receiving unit, a checking unit, a storing unit, and an alerting unit that function upon execution of a program stored in a first area of the storage; and the data registration method includes:

a receiving step of causing the receiving unit to receive data; a checking step of causing the checking unit to check whether or not a format of the data is correct;

a storing step of causing the storing unit to store, when the format of the data is correct, the data with the correct format in a second area of the storage;

an alerting step of causing the alerting unit to give an alert when the format of the data is incorrect; and an executing step of causing an executing unit of the server to execute a process to the data which has the correct format and which is stored in the second area of the storage.

A program according to a third aspect of the present disclosure causes a first computer to function as a terminal connected with a storage so as to be communicable with each other via a computer communication network, and causes a second computer to function as a server, in which:

(a) upon execution of a program stored in a first area of the storage, the program causes the first computer to function as:

a receiving unit that receives data;

a checking unit that checks whether or not a format of the data is correct;

a storing unit that stores, when the format of the data is correct, the data with the correct format in a second area of the storage; and an alerting unit that gives an alert when the format of the data is incorrect, and (b) the program causes the second computer to function as an executing unit that executes a process to the data which has the correct format and which is stored in the second area of the storage.

A non-transitory computer-readable recording medium according to a fourth aspect of the present disclosure has stored therein a program which causes a first computer to function as a terminal connected with a storage so as to be communicable with each other via a computer communication network, and which causes a second computer to function as a server, in which:

(a) upon execution of a program stored in a first area of the storage, the program causes the first computer to function as:

a receiving unit that receives data;

a checking unit that checks whether or not a format of the data is correct;

a storing unit that stores, when the format of the data is correct, the data with the correct format in a second area of the storage; and an alerting unit that gives an alert when the format of the data is incorrect, and (b) the program causes the second computer to function as an executing unit that executes a process to the data which has the correct format and which is stored in the second area of the storage.

Advantageous Effects of Invention

According to the present disclosure, received data can be easily managed.

BRIEF DESCRIPTION OF DRAWINGS

FIG. 4 is a diagram illustrating example commercial product data;

DESCRIPTION OF EMBODIMENTS

An embodiment of the present disclosure will be explained in detail with reference to the figures.

Figure 1:
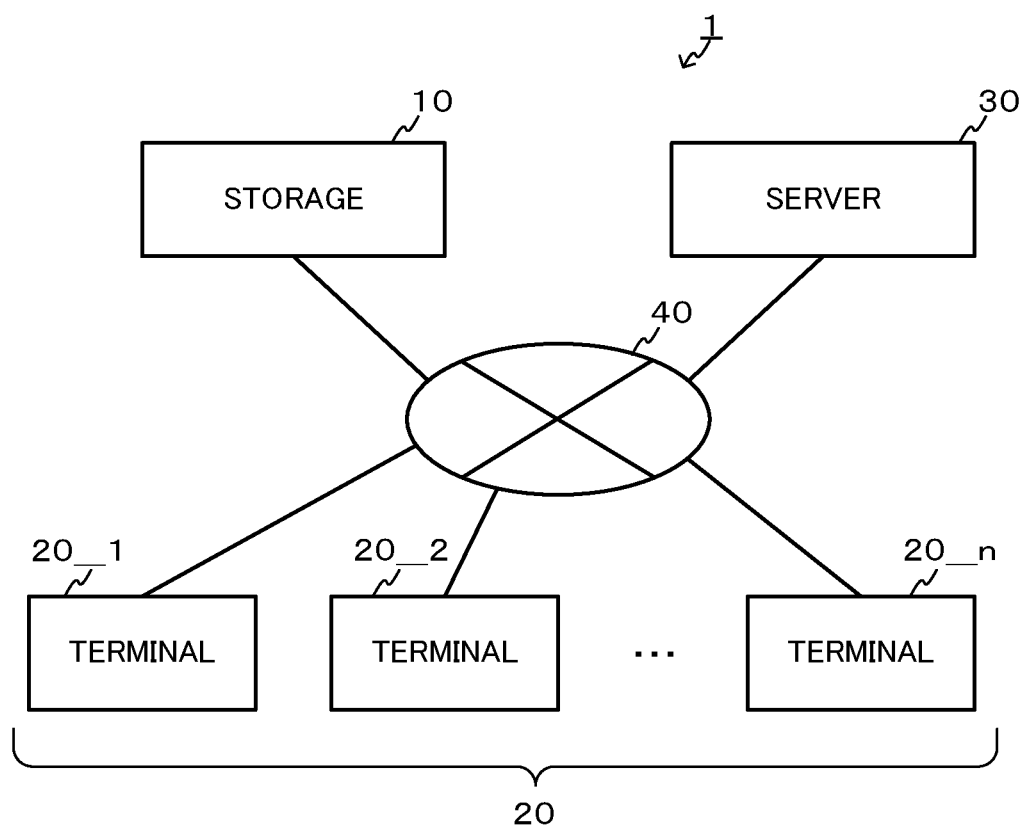
FIG. 1 is a schematic block diagram illustrating an example configuration of a data registration system according to an embodiment.

FIG. 1 illustrates an example configuration of a data registration system 1 according to an embodiment of the present disclosure. An explanation will be given of a system which is an example data registration system 1 and which manages data on a commercial product to be sold by a shop in a shopping site where multiple shops are opened up over the Internet. As illustrated in FIG. 1, the data registration system 1 includes a storage 10, an n number of terminals 20 (20_1 to 20_n), and a server 30, and the respective devices are connected one another in a manner communicable via a network 40 like the Internet.

The storage 10 is an external memory device available through a computer connected to the network 40. The storage 10 is accessible from the terminal 20 and the server 30 through an online storage service, a network storage service, or a file hosting service. In addition, this storage 10 is sometimes called a cloud storage or an online storage.

The terminals 20 are each a computer operated by each shop that sells commercial products in the shopping site. For example, the terminal 20 receives, from the shop, data on a commercial product to be sold by a shop, and stores the received data in the storage 10.

The server 30 is a computer operated by a manager who manages the shopping site. For example, the server 30 receives, from the storage 10, the data on the commercial product to be sold by each shop. Next, the server 30 creates a web page for the commercial product based on the obtained data on the commercial product, and provides this web page to the terminal (unillustrated) of a user who wants to purchase the commercial product.

Next, an explanation will be given of a configuration of a typical information processing device 50 that realizes the terminal 20 and the server 30 according to the embodiment of the present disclosure.

Figure 2:
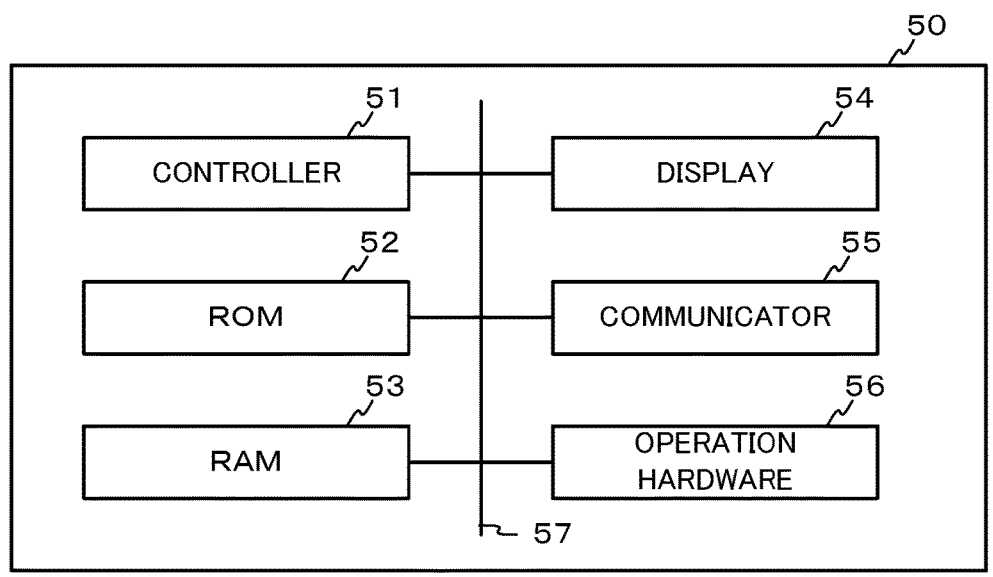
FIG. 2 is a schematic block diagram illustrating an example hardware configuration of an information processing device according to the embodiment.

FIG. 2 is a schematic block diagram illustrating a hardware configuration of the information processing device 50. As illustrated in FIG. 2, the information processing device 50 includes a controller 51, a ROM (Read Only Memory) 52, a RAM (Random Access Memory) 53, a display 54, a communicator 55, and an operation hardware 56, and respective elements are connected one another via a bus 57.

The controller 51 includes, for example, a CPU (Central Processing Unit), and controls the whole information processing device 50 in accordance with a control program recorded in the ROM 52.

The ROM 52 is a non-volatile memory that stores the program and various data for the controller 51 to control the whole information processing device 50.

The RAM 53 is a volatile memory that temporarily stores information created by the controller 51, and necessary data to create such information.

The display 54 is a display device that includes an LCD (Liquid Crystal Display), a backlight, and the like. Under the control of the controller 51, the display 54 displays, for example, data output by the controller 51.

The communicator 55 includes a communication interface to connect the information processing device 50 with the network 40.

The operation hardware 56 includes input devices, such as a button, a touch panel, and a keyboard. The operation hardware 56 receives an operation input given by the user, and outputs, to the controller 51, an operation input signal to the received operation input.

Next, a functional configuration of the data registration system 1 will be explained.

Figure 3:
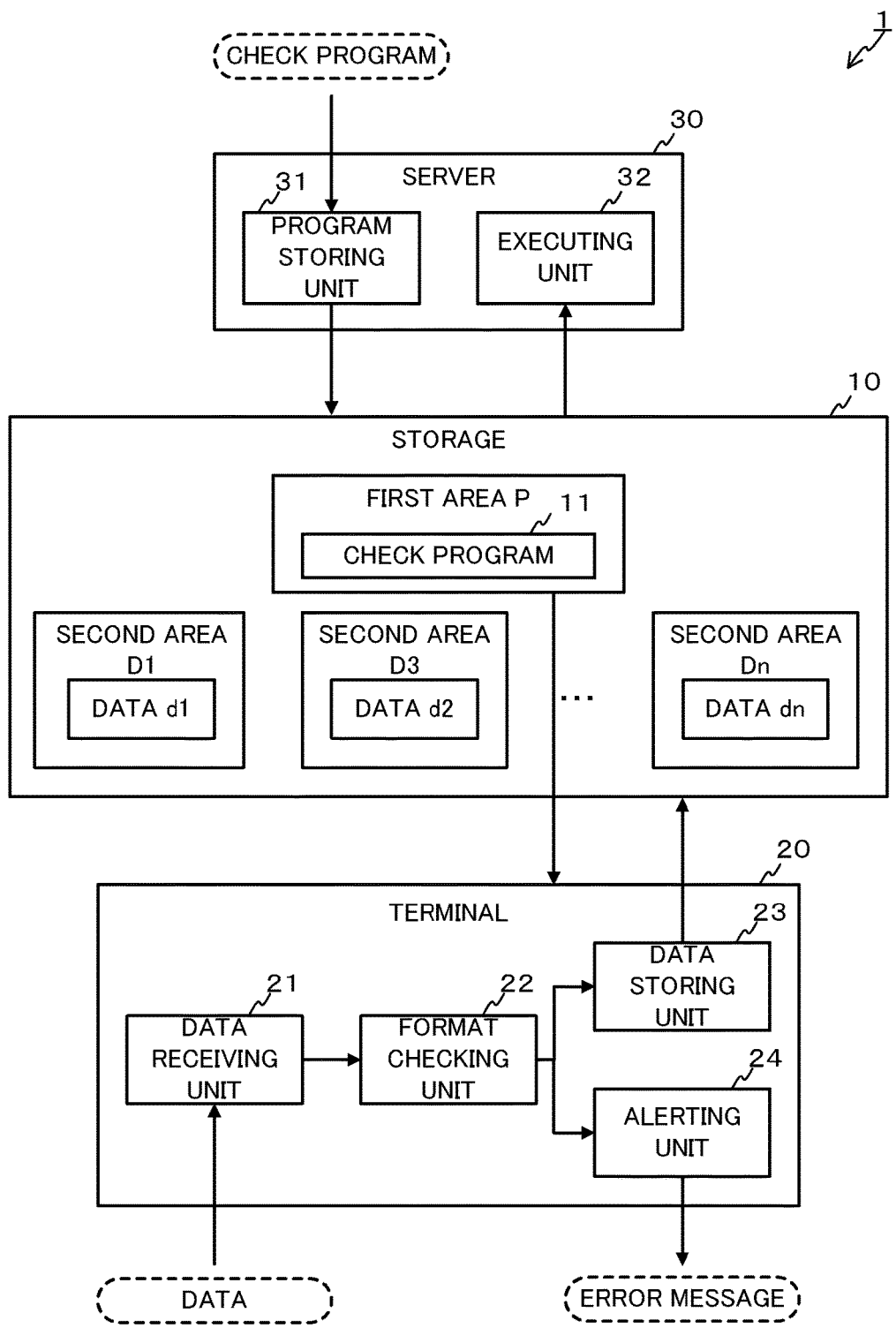
FIG. 3 is a schematic block diagram illustrating an example functional configuration of the data registration system according to the embodiment.

FIG. 3 is a schematic block diagram illustrating an example functional configuration of the data registration system 1. As illustrated in FIG. 3, the storage 10 includes, as memory areas, a first area P, and multiple second areas D1 to Dn.

The first area P is an memory area that enables the server 30 to read data therefrom and to write data therein. In addition, the first area P enables the terminal 20 to read data therefrom, but prohibits the terminal 20 to write data therein. The first area P stores a check program 11 to be executed by the terminal 20. The details of the check program 11 will be explained later.

The second areas D1 to Dn are each a memory area that enables the server 30 to read out. In addition, the second areas D1 to Dn are associated with the terminals 20_1 to 20_n, respectively. Still further, the second areas D1 to Dn enables the respective associated terminals 20 to read data therefrom and write data therein, but prohibit the non-associated terminals 20 to read data and write data. When, for example, the second area D1 is associated with the terminal 20_1, the terminal 20_1 can read data from the second area D1 and write data therein, but the other terminals 20_2 to 20_n cannot read data from the second area D1 and write data therein. The second areas D1 to Dn store respective data d1 to do uploaded from the associated terminals 20.

The terminals 20 each include a data receiving unit 21, a format checking unit 22, a data storing unit 23, and an alerting unit 24.

The data receiving unit 21 receives the data on a commercial product from the user of the terminal 20. FIG. 4 illustrates example data on a commercial product received by the data receiving unit 21. The commercial product data illustrated in FIG. 4 includes, for each commercial product, data on items, such as a commercial-product ID, a commercial-product name, a category, a sales price, and a quantity. In addition, as a general rule, the commercial product data is created in accordance with a format pre-defined by the manager of the server 30. The format is a rule for data to be contained in the commercial product data, and defines, for example, an item that must be contained in the commercial product data, a value of an item, and a limit for a number of characteristics.

Figure 5:
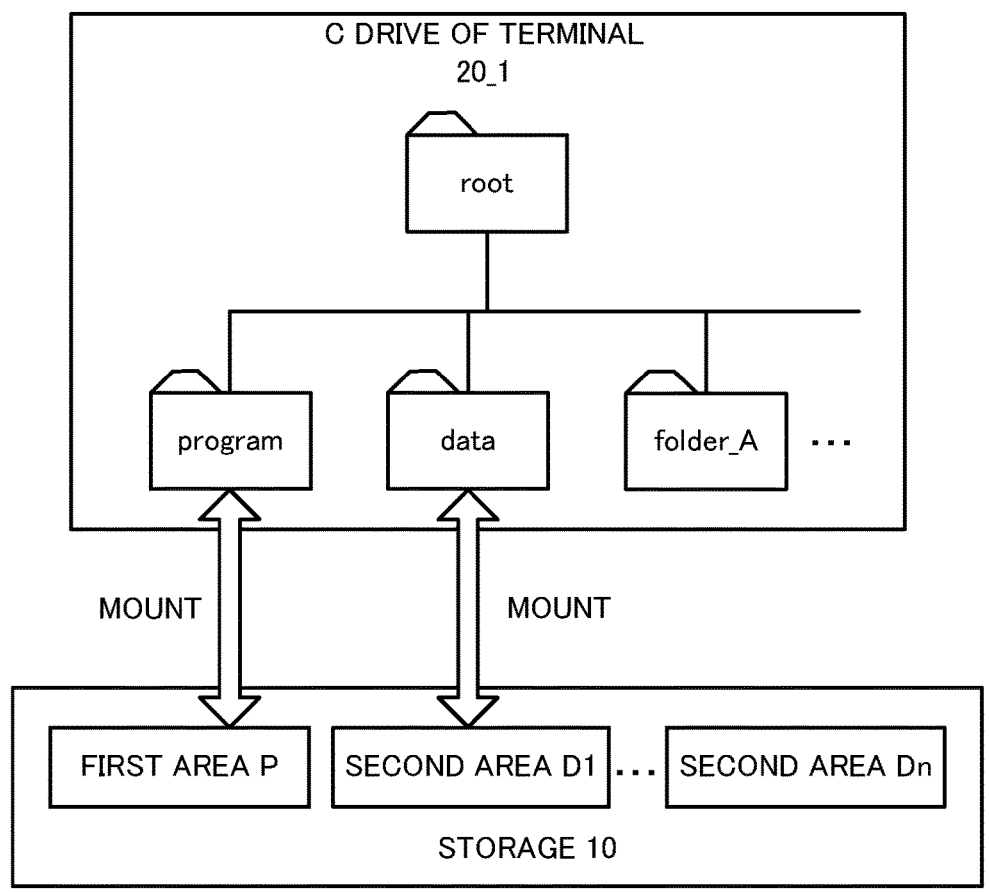
FIG. 5 is a diagram illustrating a relationship between a memory area of a storage and a folder of a terminal.

Next, with reference to FIG. 5 and FIG. 6, an explanation will be given of an example data receiving method by the data receiving unit 21. The following explanation will be given of an example case in which the data receiving unit 21 of the terminal 20_1 associated with the second area D1 of the storage 10 receives data. FIG. 5 is a diagram illustrating a relationship between a memory area of the storage 10 and a folder of the terminal 20_1. As illustrated in FIG. 5, the terminal 20_1 has a local C drive that is a file system, and the C drive is constructed with a folder tree that includes a folder "root", and folders right below this folder, such as a folder "program", a folder "data", and a folder "folder_A". In addition, the first area P of the storage 10 is mounted on the folder "program", while the second area D1 of the storage 10 is mounted on the folder "data".

Figure 6:
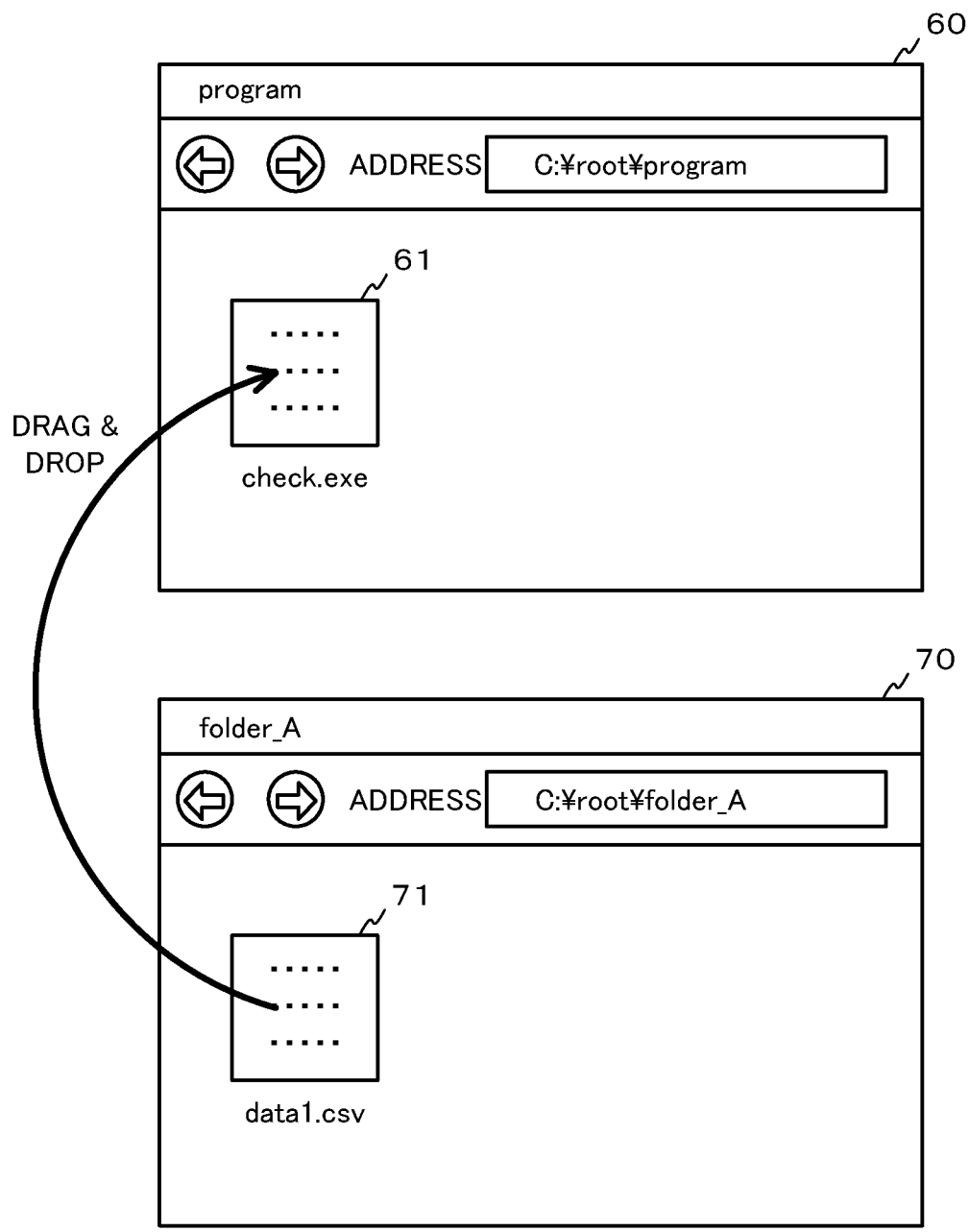
FIG. 6 is a diagram illustrating a folder displayed on a screen of the terminal.

FIG. 6 is a diagram illustrating a folder displayed on the screen of the terminal 20_1. As illustrated in FIG. 6, a screen of the terminal 20_1 displays a window 60 for the folder "program", and a window 70 for "folder_A". Since the first recording area P of the storage 10 is mounted on the folder "program", an icon 61 of a program "check.exe" that is the check program 11 is displayed in the window 60 for the folder "program". In addition, the folder "folder_A" stores a file "data1.csv" in which the commercial product data created by the user of the terminal 20_1 is written, and an icon 71 of the file "data1.csv" is displayed in the window 70 for the folder "folder_A". When the user of the terminal 20_1 drags and drops the icon 71 of the file "data1.csv" to the icon 61 of the program "check.exe", the data receiving unit 21 receives data contained in the file "data1.csv".

The format checking unit 22 checks whether or not the format of data received by the data receiving unit 21 is correct. For example, the format checking unit 22 compares the rule pre-defined as the format, such as the items that must be contained in the commercial product data, a value of the item, and the limit for a number of characters, with the data received by the data receiving unit 21, thereby determining whether this data satisfies the rule, that is, whether or not the format of this data is correct.

The data storing unit 23 stores, when the format checking unit 22 has checked that the format of the data received by the data receiving unit 21 is correct, this data in the second area D1 to Dn of the storage 10 associated with the local terminal 20.

The data storing unit 23 writes, when, for example, it has been checked that the format of the data received by the data receiving unit 21 is correct, this data in a file that has a file name based on a predetermined regulation in the second area D1 to Dn associated with the local terminal 20 to store in the second area D1 to Dn.

In this case, the predetermined regulation is a regulation to create a file name (hereinafter, referred to as a "legitimate file name") of a file that contains data with a correct format. For example, the predetermined regulation requires that the legitimate file name must contain the hash value of data. As a more specific example, the predetermined regulation requires that the legitimate file name must be a name that is obtained by adding a hash value to the original file name. When, for example, the format checking unit 22 has determined that the format of the data contained in the file "data1.csv" is correct, the data storing unit 23 calculates the hash value of the data contained in the file "data1.csv". Next, when calculating that the hash value is "12345", the data storing unit 23 adds the hash value "12345" to the original file name "data1.csv" to create a new file name "data1_12345.csv".

Figure 7:
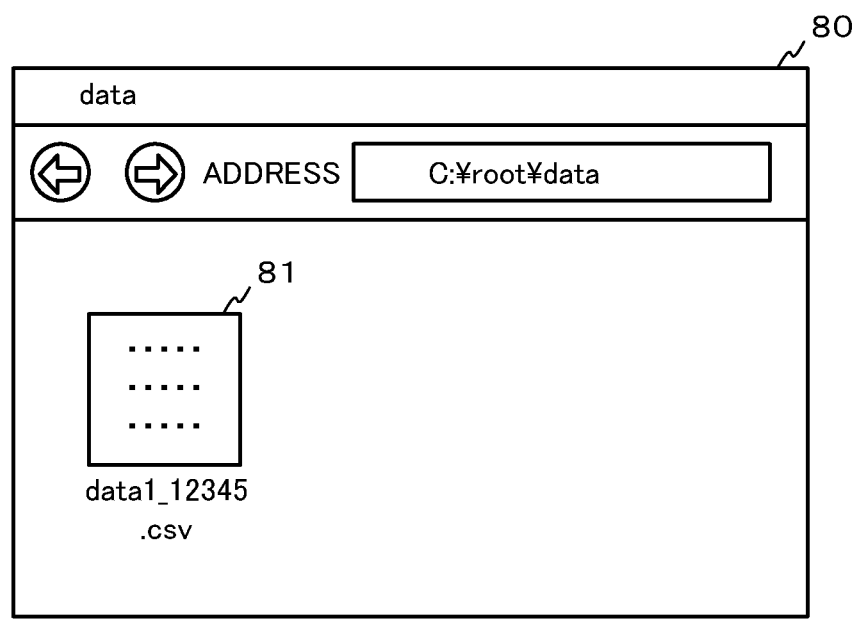
FIG. 7 is a diagram illustrating a folder displayed on the screen of the terminal.

Subsequently, the data storing unit 23 writes, in the second area D1 to Dn associated with the local terminal 20, the data having the format determined as correct in the file that has the created new file name. FIG. 7 is a diagram illustrating a folder displayed on the screen of the terminal 20_1 when it is determined through the operation illustrated in FIG. 6 that the format of the data is correct. As illustrated in FIG. 7, the screen of the terminal 20_1 displays a window 80 for the folder "data". Since the second area D1 of the storage 10 is mounted on the folder "data", the data storing unit 23 writes, in the file that has the legitimate file name "data1_12345.csv" in the folder "data", the data contained in "data1.csv" that has the format determined as correct, thereby storing this data in the second area D1. Hence, an icon 81 of the file "data1_12345.csv" that has the legitimate file name is displayed in the window 80 for the folder "data".

The alerting unit 24 gives an alert to the user of the terminal 20 when the format checking unit 22 determines that the format of the data is incorrect. For example, the alerting unit 24 displays an error message like "data format incorrect" on the screen of the terminal 20.

The processes by the data receiving unit 21, the format checking unit 22, the data storing unit 23, and the alerting unit 24 are executed in the terminal 20 by the check program 11 that utilizes the controller 51, the ROM 52, the RAM 53, the display 54, the communicator 55, the operation hardware 56, and the like which are hardware resources of the information processing device 50 realizing the terminal 20.

The server 30 includes, as illustrated in FIG. 3, a program storing unit 31 and an executing unit 32.

The program storing unit 31 receives the check program 11 from the user of the server 30, and stores this program in the first area P. For example, the program storing unit 31 receives data on the check program 11 from the user through the operation hardware 56. The program storing unit 31 may receive the check program 11 through the communicator 55. The program storing unit 31 may store the check program 11 when the first area P is mounted on the file system of the server 30 and the user drags and drops the check program 11 to the folder on which the first area P is mounted.

The executing unit 32 executes a process to data which is stored in the second area D1 to Dn of the storage 10, and which has a correct format.

For example, the executing unit 32 monitors the second areas D1 to Dn of the storage 10, and when a new file is stored in any of the second areas D1 to Dn, the executing unit reads the data contained in the stored file. Next, when the hash value of the read data is consistent with the hash value in the file name, the executing unit determines that the file name is based on the predetermined regulation, that is, the format of the data written in that file is correct.

Subsequently, when determining that the format of the data is correct, the executing unit 32 executes a process to that data. As an example process to the data, the executing unit 32 transmits, to the manager of the server 30, a mail including a message to the effect that data which has the format determined as correct is stored in the second area D1 to Dn. For example, the executing unit 32 may be realized by a work-flow engine.

The processes by the program storing unit 31 and the executing unit 32 in the server 30 are executed by a control program that utilizes the controller 51, the ROM 52, the RAM 53, the display 54, the communicator 55, the operation hardware 56, and the like which are hardware resources of the information processing device 50 realizing the server 30.

Next, an explanation will be given of an operation of the data registration system 1 of this embodiment.

Figure 8:
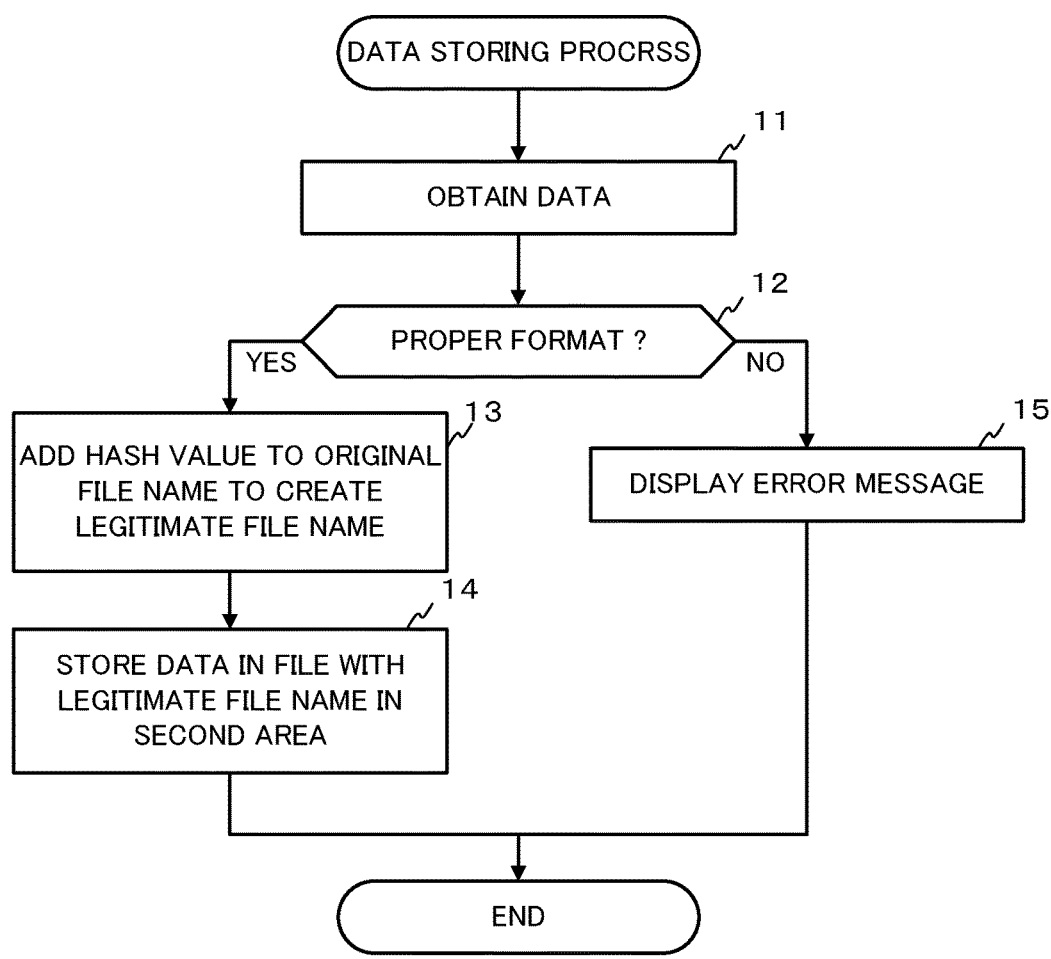
FIG. 8 is a flowchart of an example data storing process.

A data storing process executed through the check program 11 at the terminal 20 will be explained. FIG. 8 is a flowchart illustrating an example data storing process. The data storing process illustrated in FIG. 8 is started upon, for example, as illustrated in FIG. 6, a user's drag and drop operation of a file containing data on a commercial product to the check program 11 in the folder on which the first area P is mounted on the terminal 20.

First, the data receiving unit 21 receives data contained in the file that has been subjected to the drag and drop operation (step S11).

Next, the format checking unit 22 determines whether or not the format of the data received in the step S11 is correct (step S12). For example, the format checking unit 22 compares the rule predefined by the manager of the server 30 as the format of the commercial product data with the data received by the data receiving unit 21, thereby determining whether or not the format of such data is correct.

When it is determined that the format of the data is correct (step S12: YES), the data storing unit 23 adds the hash value of the data to the original file name, thereby creating a legitimate file name (step S13).

The data storing unit 23 creates a file with the legitimate file name created in the step S13 in the second area D1 to Dn associated with the local terminal 20, and writes the data in that file, thereby storing the data that has a correct format in the second area D1 to Dn (step S14). Thereafter, the data storing process is finished.

When it is determined that the format of the data is incorrect (step S12: NO), the alerting unit 24 displays an error message to the effect that the format of the data is incorrect (step S15). Thereafter, the data storing process is finished.

Figure 9:
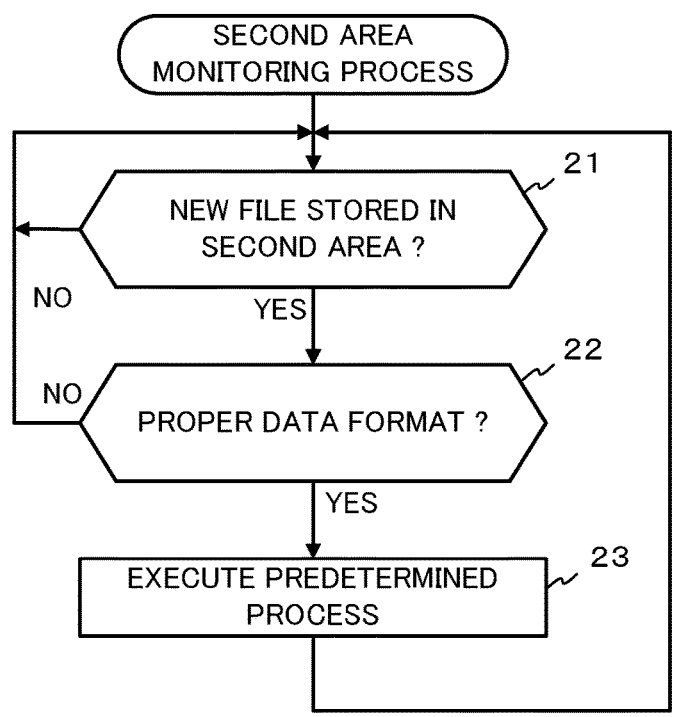
FIG. 9 is a flowchart of an example second-area monitoring process.

Next, an explanation will be given of a second area monitoring process executed by the server 30. FIG. 9 is a flowchart illustrating an example second area monitoring process. The second area monitoring process illustrated in FIG. 9 is started upon, for example, receiving of an operation input instructing the start of the second area monitoring process.

The executing unit 32 is monitoring the second areas D1 to Dn, and determines whether or not a new file is stored (step S21). The executing unit 32 continues the monitoring of the second areas D1 to Dn until determining that a new file is stored in any of the second areas D1 to Dn (step S21: NO).

When determining that a new file is stored in any of the second areas D1 to Dn (step S21: YES), the executing unit 32 determines whether or not the format of data in this file is correct (step S22). When, for example, the hash value in the file name of this new file is consistent with the hash value of data in that file, the executing unit 32 determines that the format of the data in that file is correct.

When determining that the format of data in the new file is incorrect (step S22: NO), the executing unit 32 returns the process to the step S21.

When determining that the format of data in the new file is correct (step S22: YES), the executing unit 32 executes a predetermined process to that data (step S23). For example, the executing unit 32 transmits, to the user of the server 30, a mail containing a message to the effect that a new file is stored in any of the second areas D1 to Dn. Subsequently, the executing unit 32 returns the process to the step S21.

The executing unit 32, for example, repeats the above-explained processes until receiving an operation input instructing the finishing of the second area monitoring process.

As explained above, according to the data registration system 1 of this embodiment, through the check program 11 stored in the storage 10, whether or not the format of data received by the terminal 20 is correct is checked. Hence, the user of the server 30 can receive data that has a correct format only. In addition, a work for the user of the server 30 to check the format of data can be eliminated.

Still further, when the format of data is incorrect, an alert is given to the user of the terminal 20. Accordingly, the user can have an opportunity to correct the data in accordance with the alert.

Yet still further, data that has a correct format is written in a file which has a file name based on the predetermined regulation, and is stored in the second area. Hence, by checking the file name of the file stored in the second area, the server 30 can determine whether or not to accept the file.

An embodiment of the present disclosure was explained above, but the present disclosure is not limited to the embodiment only.

For example, in the above-explained embodiment, the first area P prohibits the terminals 20 to write data therein, but may permit the terminals 20 to write data therein. When, however, the first area P prohibits the terminals 20 to write data therein, it becomes possible to avoid a case in which the check program 11 is changed through the terminals 20 despite the manager's intension of the server 30.

In addition, in the above-explained embodiment, the data receiving unit 21 receives the commercial product data when the user drags and drops a file containing commercial product data to the check program 11 in the folder on the terminal 20 on which the first area P is mounted, but how to receive the data is not limited to this scheme. For example, the check program 11 may be copied in the local storage of the terminal 20 beforehand. In this case, when the user drags and drops a file containing commercial product data to the check program 11 stored in the local storage, the commercial product data may be received.

Still further, when the data storing process is executed through the check program 11 stored in the local storage of the terminal 20, the format checking unit 22 may check whether or not the version of the check program stored in the local storage is the latest version prior to the format check of received data. For example, the format checking unit 22 checks whether or not the version of the check program stored in the local storage is consistent with that of the check program stored in the first area P. When it is determined that the version of the check program stored in the local storage is not latest, the alerting unit 24 may inform the user of the terminal 20 that the check program currently stored in the first area P should be downloaded and be executed. Hence, the terminal 20 can always execute the data storing process using the latest check program 11. In addition, it becomes possible to prevent data that has the format checked through the older check program 11 from being stored in the second area D1 to Dn.

Still further, the data storing unit 23 of the terminal 20 may store, in the second area D1 to Dn, the version of the check program 11 executed by the terminal 20 or the hash value of the program together with data that has a correct format. The executing unit 32 of the server 30 may compare, to execute the process, the version of the check program 11 stored in the first area P or the hash value with the version or the hash value stored in the second area D1 to Dn. When, for example, the versions or the hash values are consistent with each other, the executing unit 32 may execute the process to the stored data. When the versions or the hash values are inconsistent with each other, the executing unit 32 may inform the terminal 20 that the check program currently stored in the first area P should be executed.

In the above-explained embodiment, the program executed by the terminal 20 and the server 30 may be distributed in a manner stored in a non-transitory computer-readable recording medium, such as a flexible disk, a CD-ROM (Compact Disk Read-Only Memory), a DVD (Digital Versatile Disk), or an MO (Magneto-Optical Disk). Next, by installing such a program in an information processing device like a computer, the terminal 20 and the server 30 that executes the above-explained processes may be realized.

The program may be stored in a disk device or the like of a predetermined server device on a communication network like the Internet. This program may be downloaded in a manner superimposed on, for example, carrier waves.

When the above-explained functions are realized in a manner shared by an OS (Operating System) or are realized by the cooperative works of the OS with an application, only the program portion other than the portions that realize the functions by the OS may be stored in and distributed with a non-transitory recording medium, or may be downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for an electronic commerce that utilizes a computer communication network like the Internet.

REFERENCE SIGNS LIST

1 Data registration system
10 Storage
11 Check program
20 (20_1 to 20_n) Terminal
21 Data receiving unit
22 Format checking unit
23 Data storing unit
24 Alerting unit
30 Server
31 Program storing unit
32 Executing unit
40 Network
50 Information processing device
51 Controller
52 ROM
53 RAM
54 Display
55 Communicator
56 Operation hardware
57 Bus
60, 70, 80 Window
61, 71, 81 Icon

The invention claimed is:
1. A data registration system comprising:
a terminal;
a storage; and
a server, wherein the terminal the storage and the server are configured to communicate with one another via a computer communication network, and wherein the storage is accessible from the terminal and the server through an online storage service, a network storage service, or a file hosting service and wherein:

(a) the terminal, upon an execution of a program stored in a first area of the storage, is configured to:
   receive data,
   check whether or not a format of the data is correct,
   store, when the format of the data is correct, the data with the correct format in a file that has a file name based on a predetermined regulation in a second area of the storage, and
   alert when the format of the data is incorrect, and
(b) the server is configured to:
   read data, from the file which has the file name based on the predetermined regulation and which is stored in the second area of the storage, and
   execute a process based on the read data.

2. The data registration system according to claim 1, wherein:
   the file name based on the predetermined regulation contains a hash value of the data; and
   the server is configured to execute the process based on the read data only when the hash value in the file name based on the predetermined regulation is consistent with a hash value of the data read from the file that has the file name based on the predetermined regulation.

3. The data registration system according to claim 1, wherein:
   the first area enables the server to read data therefrom and write data therein, and enables the terminal and other terminals to read data therefrom;
   the second area enables the server to read data therefrom, enables the terminal to read data therefrom and write data therein, and prohibits the other terminals to read data therefrom and write data therein; and
   a latest version of the program is stored in the first area by the server.

4. The data registration system according to claim 3, wherein:
   the first area and the second area are mounted on a file system of the terminal; and
   when, in the terminal, a file containing the data is subjected to a drag and drop operation to the program or a program that is a copy of the program in a local storage of the terminal, the terminal is further configured to: i) execute the program subjected to the drag and drop operation, and ii) receive data contained in the file subjected to the drag and drop operation.

5. The data registration system according to claim 4, wherein the alert is given when there is a file that has a file name not based on the predetermined regulation in the second area.

6. The data registration system according to claim 4, wherein:
   the terminal is further configured to store, in the second area, a version of a program executed by the terminal or a hashed value of the program together with the data that has the correct format; and
   the server is further configured to:
   (1) execute the process on the stored data when the version or the hash value of the program stored in the first area is consistent with the version or the hash value of the program stored in the second area, and
   (2) inform the terminal that the program currently stored in the first area should be executed when the version or the hash value of the program stored in the first area is inconsistent with the version or the hash value of the program stored in the second area.

7. A data registration system comprising:
   a terminal;
   a storage; and
   a server, wherein:
   the storage is accessible from the terminal and the server through an online storage service, a network storage service, or a file hosting service,
   a first area of the storage enables the server to read data therefrom and write data therein, and enables the terminal and other terminals to read data therefrom, and
   a second area of the storage enables the server to read data therefrom, enables the terminal to read data therefrom and write data therein, and prohibits the other terminals to read data therefrom and write data therein, wherein
   (a) the server is configured to store a latest version of a program executed by the terminal in the first area of the storage,
   (b) the terminal, upon an execution of the program stored in the first area of the storage, is configured to:
   receive data;
   check whether or not a format of the data is correct;
   store, when the format of the data is correct, the data with the correct format in the second area of the storage; and
   alert when the format of the data is incorrect, and
   (c) the server is further configured to execute a process based on the data which has the correct format and which is stored in the second area of the storage.

8. The data registration system according to claim 7, wherein:
   the terminal is further configured to store the data with the correct format in a file that has a file name based on a predetermined regulation in a second area of the storage,
   the file name based on the predetermined regulation contains a hash value of the data; and
   the server is further configured to execute the process based on the read data when the hash value in the file name based on the predetermined regulation is consistent with a hash value of the data read from the file that has the file name based on the predetermined regulation.

9. The data registration system according to claim 8, wherein:
   the server is further configured to store a latest version of the program in the first area.

10. The data registration system according to claim 9, wherein:
   the first area and the second area are mounted on a file system of the terminal; and
   when, in the terminal, a file containing the data is subjected to a drag and drop operation to the program or a program that is a copy of the program in a local storage of the terminal, the terminal is further configured to: i) execute the program subjected to the drag and drop operation, and ii) receive data contained in the file subjected to the drag and drop operation.

11. The data registration system according to claim 10, wherein the terminal is further configured to give the alert when there is a file that has a file name not based on the predetermined regulation in the second area.

12. The data registration system according to claim 10, wherein:
   the terminal is further configured to store, in the second area, a version of a program executed by the terminal or a hashed value of the program together with the data that has the correct format: and the server is further configured to:
(1) execute the process based on the stored data when the version of the program stored in the first area or the hash value is consistent with the version or the hash value stored in the second area; and
(2) inform the terminal that the program currently stored in the first area should be executed when the version of the program stored in the first area or the hash value is inconsistent with the version or the hash value stored in the second area.

13. A data registration method executed by a data registration system comprising a terminal, a storage, and a server configured to communicate with one another via a computer communication network, wherein the storage is accessible from the terminal and the server through an online storage service, a network storage service, or a file hosting service, wherein the data registration method comprises:
receiving data by the terminal upon execution of a program stored in a first area of the storage;
checking whether or not a format of the data is correct by the terminal upon execution of the program;
storing, when the format of the data is correct, the data in a file that has a file name based on a predetermined regulation in a second area of the storage by the terminal upon execution of the program;
alerting when the format of the data is incorrect by the terminal upon executing the program; and
executing a process based on the data by reading the data from the file which has the file name based on the predetermined regulation and which is stored in the second area of the storage.

14. The data registration method according to claim 13, wherein:
the file name based on the predetermined regulation contains a hash value of the data; and
the executing further comprises only executing the process based on the read data when the hash value in the file name based on the predetermined regulation is consistent with a hash value of the data read from the file that has the file name based on the predetermined regulation.

15. The data registration method according to claim 13, wherein:
the first area enables the server to read data therefrom and write data therein, and enables the terminal and other terminals to read data therefrom;
the second area enables the server to read data therefrom, enables the terminal to read data therefrom and write data therein, and prohibits the other terminals to read data therefrom and write data therein; and
the data registration method further comprises storing, by the server
a latest version of the program in the first area.

16. The data registration method according to claim 15, wherein:
the first area and the second area are mounted on a file system of the terminal; and
the data registration method further comprises when, in the terminal, a file containing the data is subjected to a drag and drop operation to the program or a program that is a copy of the program in a local storage of the terminal, executing, by the terminal, the program subjected to the drag and drop operation based on data contained in the file subjected to the drag and drop operation.

17. The data registration method according to claim 16, wherein the alerting is based on a file that has a file name not based on the predetermined regulation in the second area.

18. The data registration method according to claim 16, wherein:
the storing further comprises storing, in the second area, a version of a program executed by the terminal or a hashed value of the program together with the data that has the correct format: and
the executing further comprises:
(1) executing the process based on the stored data when the version or the hash value of the program stored in the first area is consistent with the version or the hash value of the program stored in the second area; and
(2) informing the terminal that the program currently stored in the first area should be executed when the version or the hash value of the program stored in the first area is inconsistent with the version or the hash value of the program stored in the second area.

19. A data registration method executed by a data registration system comprising a terminal, a storage, and a server configured to communicate with one another via a computer communication network, wherein:
the storage is accessible from the terminal and the server through an online storage service, a network storage service, or a file hosting service;
a first area of the storage enables the server to read data therefrom and write data therein, and enables the terminal and other terminals to read data therefrom; and
a second area of the storage enables the server to read data therefrom, enables the terminal to read data therefrom and write data therein, and prohibits the other terminals to read data therefrom and write data therein, the data registration method comprising:
storing a latest version of a program executed by the terminal in the first area of the storage;
receiving data by the terminal upon executing the program stored;
checking whether or not a format of the data is correct;
storing, when the format of the data is correct, the data with the correct format in the second area of the storage by the terminal upon executing the program; and
alerting when the format of the data is incorrect by the terminal upon executing the program, and
executing a process based on the data which has the correct format and which is stored in the second area of the storage by the server.

20. The data registration method according to claim 19, wherein:
the storing the data with the correct format further comprises storing the data with the correct format in a file that has a file name based on a predetermined regulation in a second area of the storage, wherein the file name based on the predetermined regulation contains a hash value of the data; and
the executing the process further comprises only executing the process when the hash value in the file name based on the predetermined regulation is consistent with a hash value of the data read from the file that has the file name based on the predetermined regulation.

21. The data registration method according to claim 20, further comprising storing, by the server,
a latest version of the program in the first area.

22. The data registration system according to claim 21, wherein:
the first area and the second area are mounted on a file system of the terminal; and the data registration method further comprises when, in the terminal, a file containing the data is subjected to a drag and drop operation to the program or a program that is a copy of the program in a local storage of the terminal, executing, by the terminal, the program subjected to the drag and drop operation based on data contained in the file subjected to the drag and drop operation.

23. The data registration method according to claim 22, wherein the alerting alerts when there is a file that has a file name not based on the predetermined regulation in the second area.

24. The data registration method according to claim 22, wherein:
the storing the data with the correct format further comprises storing, in the second area, a version of a program executed by the terminal or a hashed value of the program together with the data that has the correct format; and
the executing a process further comprises:
(1) executing the process based on the stored data when the version or the hash value of the program stored in the first area is consistent with the version or the hash value of the program stored in the second area; and
(2) informing the terminal that the program currently stored in the first area should be executed when the version or the hash value of the program stored in the first area is inconsistent with the version or the hash value of the program stored in the second area.

25. A non-transitory computer-readable recording medium having stored therein a first program which causes a first computer to function as a terminal connected with a storage so as to be communicable with each other via a computer communication network, and which causes a second computer to function as a server, wherein the storage is accessible from the first computer and the second computer through an online storage service, a network storage service, or a file hosting service,
wherein:
(a) upon execution of a second program stored in a first area of the storage, the first program causes the first computer to:
receive data;
check whether or not a format of the data is correct;
store, when the format of the data is correct, the data with the correct format in a file that has a file name based on a predetermined regulation in a second area of the storage; and
alert when the format of the data is incorrect, and
(b) the first program causes the second computer to:
read data, from the file which has the file name based on the predetermined regulation, and which is stored in the second area of the storage, and
execute a process based on the data which has the correct format and which is stored in the second area of the storage.

* * * * *